(12) United States Patent
Venkataramu et al.

(10) Patent No.: US 10,932,326 B2
(45) Date of Patent: Feb. 23, 2021

(54) FLEXIBLE HEATED HOSE ASSEMBLY WITH PRINTED POSITIVE TEMPERATURE CO-EFFICIENT HEATER

(71) Applicant: Goodrich Corporation, Charlotte, NC (US)

(72) Inventors: Raghavendra Hassan Venkataramu, Karnataka (IN); Rhushikesh Patil, Karnataka (IN); Gururaja Bambila, Karnataka (IN); Aruna Kumar Huluvangala Krishnappa, Karnataka (IN)

(73) Assignee: GOODRICH AEROSPACE SERVICES PRIVATE LIMITED, Karnataka (IN)

( * ) Notice: Subject to any disclaimer, the term of this patent is extended or adjusted under 35 U.S.C. 154(b) by 256 days.

(21) Appl. No.: 16/039,530

(22) Filed: Jul. 19, 2018

(65) Prior Publication Data

US 2019/0364620 A1 Nov. 28, 2019

(30) Foreign Application Priority Data

May 24, 2018 (IN) .............................. 201811019525

(51) Int. Cl.
*H05B 3/58* (2006.01)
*B29C 63/00* (2006.01)
(Continued)

(52) U.S. Cl.
CPC ........... *H05B 3/58* (2013.01); *B29C 63/0017* (2013.01); *B29C 63/0073* (2013.01);
(Continued)

(58) Field of Classification Search
CPC ... H05B 3/58; H05B 3/54; H05B 3/40; H05B 3/46; H05B 3/56; H05B 2203/013; H05B 2203/02; H05B 2203/021; H05B 2203/022; H05B 2203/012; B29C 63/0017; B29C 63/0073; B29C 65/4825; B29C 70/30; B29K 2677/10; B29K 2683/00;
(Continued)

(56) References Cited

U.S. PATENT DOCUMENTS 4,459,473 A 7/1984 Kamath
4,874,925 A 10/1989 Dickernson
(Continued)

FOREIGN PATENT DOCUMENTS

DE 202017106495 U1 11/2017
EP 0312204 A2 4/1989
EP 1710484 A1 10/2006

OTHER PUBLICATIONS

The Extended European Search Report for Application No. 19176258. 2-1204; Report dated Sep. 12, 2019; Report receieved Sep. 19, 2019; 9 pages.

*Primary Examiner* — Shawntina T Fuqua
(74) *Attorney, Agent, or Firm* — Cantor Colburn LLP

(57) ABSTRACT

A flexible heated hose assembly for an aircraft is provided. The flexible heated hose assembly including: an inner fluid tube enclosing a fluid passageway, the inner fluid tube having tubular shape; a first silicone liner located radially outward from the inner fluid tube; and a printed positive temperature co-efficient (PTC) heater located radially outward from the first silicone liner.

18 Claims, 4 Drawing Sheets

(51) Int. Cl.
*B29C 65/48* (2006.01)
*B29C 70/30* (2006.01)
*B29K 683/00* (2006.01)
*B29K 705/12* (2006.01)
*B29L 23/00* (2006.01)

(52) U.S. Cl.
CPC .......... *B29C 65/4825* (2013.01); *B29C 70/30* (2013.01); *B29K 2677/10* (2013.01); *B29K 2683/00* (2013.01); *B29K 2705/12* (2013.01); *B29L 2023/005* (2013.01)

(58) Field of Classification Search
CPC ........... B29K 2705/12; B29L 2023/005; F16L 53/30; F16L 53/00; F16L 53/32; F16L 53/35; F16L 53/37; F16L 53/38
See application file for complete search history.

(56) References Cited

U.S. PATENT DOCUMENTS

| | | |
|---|---|---|
| 5,117,094 A | 5/1992 | Jensen |
| 7,203,419 B2 | 4/2007 | Malone et al. |
| 8,450,667 B2 | 5/2013 | Gunzing et al. |
| 8,712,227 B2 | 4/2014 | Meisiek et al. |
| 8,820,362 B2 | 9/2014 | Roederer et al. |
| 9,644,776 B2 | 5/2017 | Westmeier et al. |
| 2002/0040898 A1* | 4/2002 | Von Arx ............. B29C 66/4326 219/535 |
| 2011/0274418 A1* | 11/2011 | Meisiek .................. F16L 53/38 392/480 |
| 2011/0274481 A1 | 11/2011 | Chen |
| 2016/0040806 A1* | 2/2016 | Garrett .................... F16L 11/10 138/125 |
| 2016/0312924 A1 | 10/2016 | Kolarski et al. |
| 2017/0009926 A1 | 1/2017 | Marucci et al. |

* cited by examiner

FLEXIBLE HEATED HOSE ASSEMBLY WITH PRINTED POSITIVE TEMPERATURE CO-EFFICIENT HEATER

CROSS-REFERENCE TO RELATED APPLICATIONS

This application claims priority to and the benefit of Provisional Indian Application No. 201811019525 filed May 24, 2018, and all the benefits accruing therefrom under 35 U.S.C. § 119, the content of which is incorporated herein in its entirety by reference.

BACKGROUND

The subject matter disclosed herein generally relates to the field of aircraft fluid lines, and more particularly to an apparatus and method to prevent aircraft fluid line from freezing.

Due to decreasing temperatures in the upper levels of the atmosphere, water lines of aircraft face the risk of potentially freezing during flight. Many types of aircraft use resistance heater wire technology to maintain a temperature above freezing for aircraft potable water lines, aircraft wasted water lines, and aircraft gray water lines. Resistance heater wire technology is dependent upon external control systems to regulate the temperature of the resistance heater wire, which complicates close temperature regulation.

BRIEF SUMMARY

According to one embodiment, a flexible heated hose assembly for an aircraft is provided. The flexible heated hose assembly including: an inner fluid tube enclosing a fluid passageway, the inner fluid tube having tubular shape; a first silicone liner located radially outward from the inner fluid tube; and a printed positive temperature co-efficient (PTC) heater located radially outward from the first silicone liner.

In addition to one or more of the features described above, or as an alternative, further embodiments may include that a pressure sensitive adhesive interposed between the first silicone liner and the printed PTC heater, the printed PTC heater is attached to the first silicone liner via the pressure sensitive adhesive.

In addition to one or more of the features described above, or as an alternative, further embodiments may include that at least one of a second silicone liner, a first Aramid fiber braid, a third silicone liner, a corrosion resistant steel (CRES) braid, and a second Aramid fiber braid.

In addition to one or more of the features described above, or as an alternative, further embodiments may include a polyimide liner located radially outward from the printed PTC heater.

In addition to one or more of the features described above, or as an alternative, further embodiments may include that the inner fluid tube is coated with a fully fluorinated fluoropolymer coating.

In addition to one or more of the features described above, or as an alternative, further embodiments may include a second silicone liner located radially outward from the printed PTC heater; a first Aramid fiber braid located radially outward from the second silicone liner; a third silicone liner located radially outward from the first Aramid fiber braid; a corrosion resistant steel (CRES) braid located radially outward from the third silicone liner; and a second Aramid fiber braid located radially outward from the CRES braid.

In addition to one or more of the features described above, or as an alternative, further embodiments may include: a second silicone liner located radially outward from the printed PTC heater.

In addition to one or more of the features described above, or as an alternative, further embodiments may include a first Aramid fiber braid located radially outward from the second silicone liner.

In addition to one or more of the features described above, or as an alternative, further embodiments may include: a third silicone liner located radially outward from the first Aramid fiber braid.

In addition to one or more of the features described above, or as an alternative, further embodiments may include: a corrosion resistant steel (CRES) braid located radially outward from the third silicone liner.

According to another embodiment, a method of manufacturing a flexible heated hose assembly for an aircraft is provided. The method including wrapping a first silicone liner around an inner fluid tube enclosing a fluid passageway, the inner fluid tube having a tubular shape; wrapping a printed positive temperature co-efficient (PTC) heater around the first silicone liner; and curing the flexible heated hose assembly.

In addition to one or more of the features described above, or as an alternative, further embodiments may include: attaching the printed PTC heater to the first silicone liner using a pressure sensitive adhesive interposed between the first silicone liner and the printed PTC heater.

In addition to one or more of the features described above, or as an alternative, further embodiments may include that prior to the curing the method further includes at least one of: wrapping a second silicone liner around the printed PTC heater; wrapping a first Aramid fiber braid around the printed PTC heater; and wrapping a corrosion resistant steel (CRES) braid around the printed PTC heater.

In addition to one or more of the features described above, or as an alternative, further embodiments may include that prior to the curing the method further includes: wrapping a second silicone liner around the printed PTC heater; wrapping a first Aramid fiber braid around the second silicone liner; wrapping a third silicone liner around the first Aramid fiber braid; wrapping a corrosion resistant steel (CRES) braid around the third silicone liner; and wrapping a second Aramid fiber braid around the CRES braid.

In addition to one or more of the features described above, or as an alternative, further embodiments may include that prior to the curing the method further includes: wrapping a second silicone liner around the printed PTC heater.

In addition to one or more of the features described above, or as an alternative, further embodiments may include that prior to the curing the method further includes: wrapping a first Aramid fiber braid around the second silicone liner.

In addition to one or more of the features described above, or as an alternative, further embodiments may include that prior to the curing the method further includes: wrapping a third silicone liner around the first Aramid fiber braid.

In addition to one or more of the features described above, or as an alternative, further embodiments may include that prior to the curing the method further includes: wrapping a corrosion resistant steel (CRES) braid around the third silicone liner.

In addition to one or more of the features described above, or as an alternative, further embodiments may include that prior to the curing the method further includes: wrapping a a polyimide liner around the printed PTC heater.

In addition to one or more of the features described above, or as an alternative, further embodiments may include: coating the inner fluid tube with a fully fluorinated fluoropolymer.

Technical effects of embodiments of the present disclosure include preventing an aircraft fluid line from freezing utilizing a printed PTC heater.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
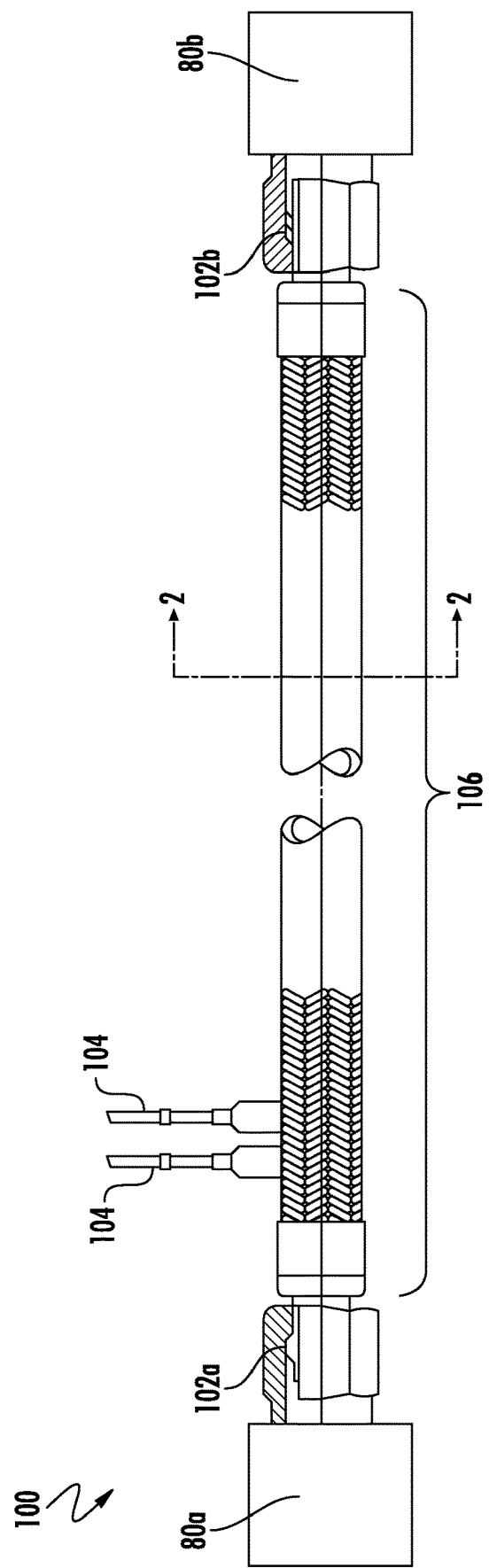
FIG. 1 illustrates a flexible heated hose assembly, according to an embodiment of the present disclosure.
Figure 2:
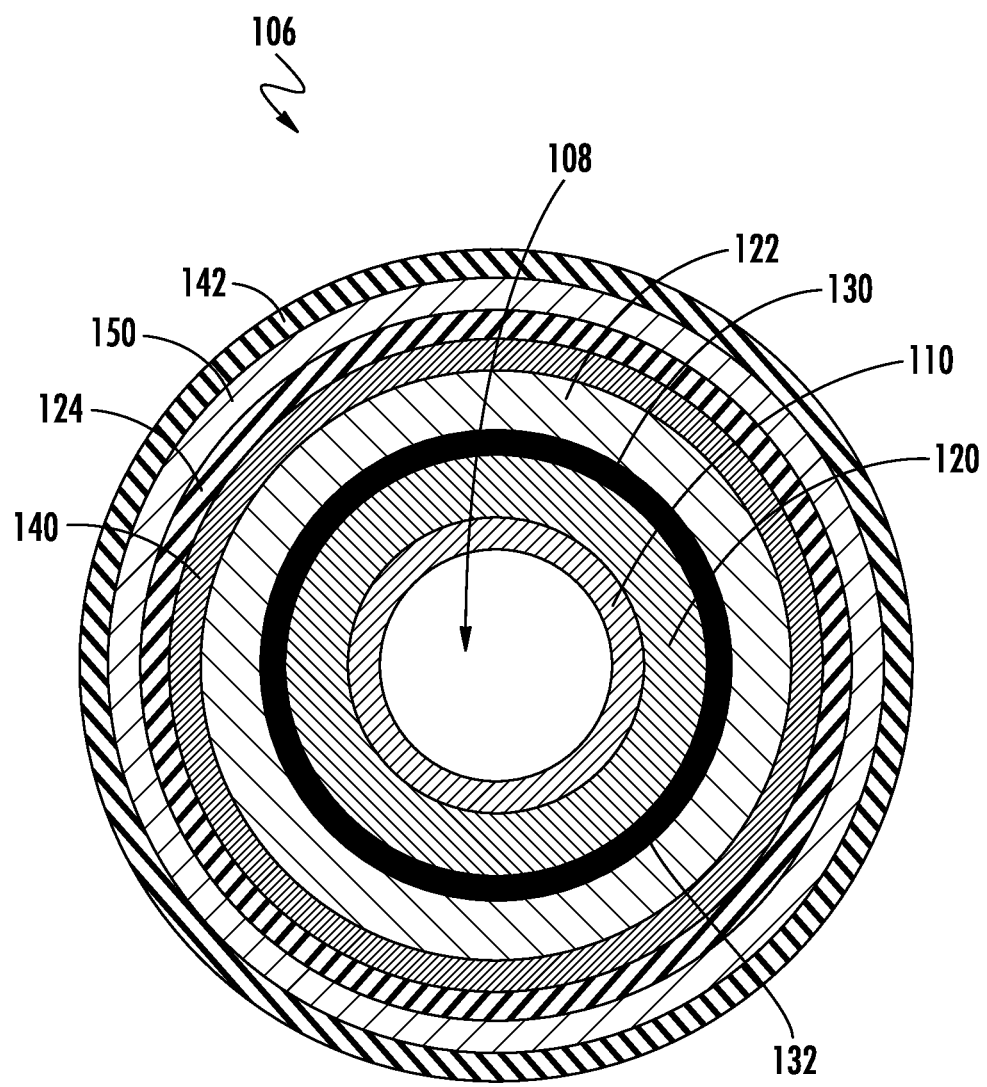
FIG. 2 illustrates a cross-sectional view the flexible heated hose assembly of FIG. 1, according to an embodiment of the present disclosure.

Referring to FIGS. 1-4. FIGS. 1-2 illustrate a flexible heated hose assembly 100 having a printed positive temperature co-efficient (PTC) heater 130. The printed PTC heater 130 may be an ink heater manufactured through flexographic printing, rotogravure printing, or screen printing. The printed PTC heater may include a polyimide film, a PTC heater ink, and a heat seal adhesive. The flexible heated hose assembly 100 may serve as a fluid line for an aircraft fluid system in order to prevent fluid within the fluid system from freezing. In an embodiment, the fluid may be water. The flexible heated hose assembly 100 may connect to other aircraft components 80a, 80b through end fittings 102a, 102b. The end fittings 102a, 102b may be threaded fasteners. A first end fitting 102a may securely connect to a first aircraft component 80a to create a fluid connection between the first aircraft component 80a and the flexible heated hose assembly 100. A second end fitting 102b may securely connect to a second aircraft component 80b to create a fluid connection between the second aircraft component 80b and the flexible heated hose assembly 100. The flexible heated hose assembly 100 fluidly connects the first aircraft component 80a to the second aircraft component 80b. The aircraft components 80a, 80b may include but are not limited to valves, storage tank, connectors, fitting or drain in fluid line.

Figure 3:
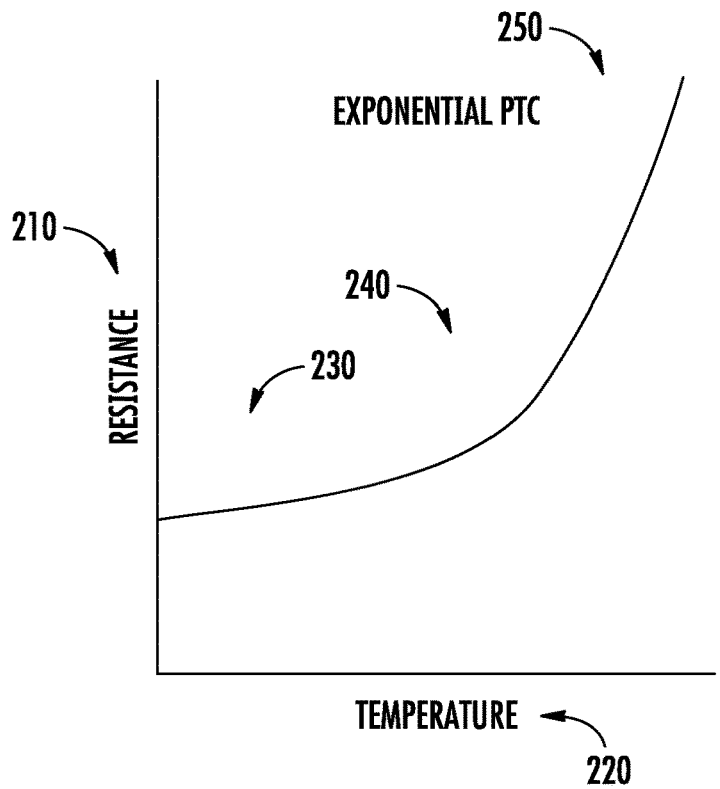
FIG. 3 illustrates a resistance versus temperature graph for a printed PTC heater, according to an embodiment of the present disclosure.

Fluid may be transported by the flexible heated hose assembly 100 through a fluid passage way 108 located within a tubular hose body 106. The tubular hose body 106 is interposed between the first fitting 102a and the second fitting 102b. As shown in FIG. 2, the tubular hose body 106 is tubular in shape and encloses the fluid passageway 108. The tubular hose body 106 may be composed of different layers of material, as shown in FIG. 2. The tubular hose body 106 includes a printed PTC heater 130. An inherent property of PTC heater 130 is that when voltage is applied to the printed PTC heater 130, sufficient current flows through the printed PTC heater 130 and a temperature 220 of the printed PTC heater 130 increases, as shown in FIG. 3. At a first temperature 230, the resistance 210 is low and current is high, which leads to rapid heating of the printed PTC heater 130. At a second temperature 240 (i.e., a set temperature), the resistance 210 the resistance begins to increase dramatically. As a second temperature 240 (i.e., a set temperature) of the printed PTC heater 130 increases, the resistance 210 increases dramatically, allowing much less current to flow, as seen in FIG. 3. At around a third temperature 250, the resistance 210 of the printed PTC heater 130 begins to increases exponentially with temperature 220 and leads to very low current through the printed PTC heater 130 and very little heating by the printed PTC heater 130, which serves as an over heat protection for the printed PTC heater 130.

Figure 4:
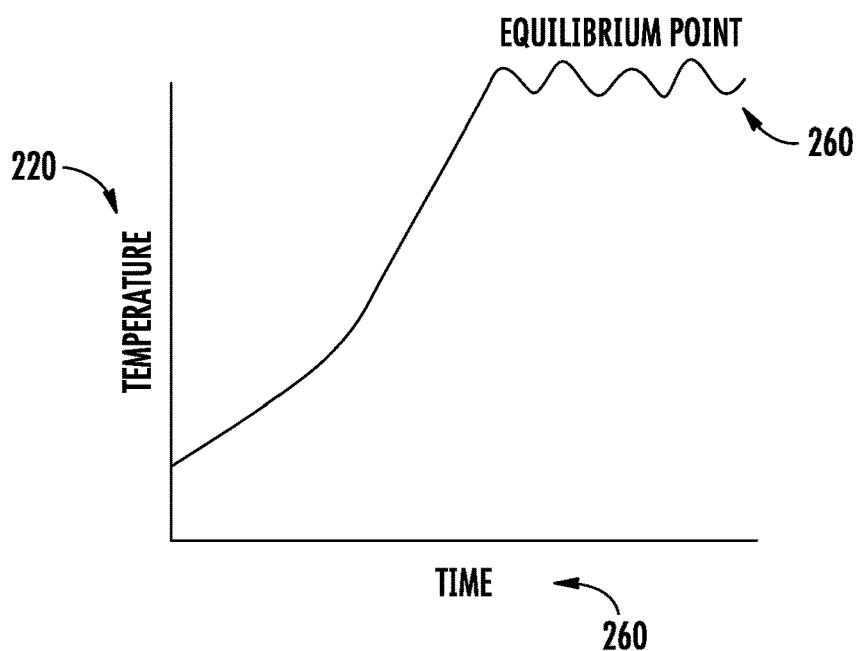
FIG. 4 illustrates a temperature versus time graph for a printed PTC heater, according to an embodiment of the present disclosure.

If the voltage remains constant over time 260, the current will stabilize at a certain value as the printed PTC heater 130 reaches a thermal equilibrium temperature 270 as shown in FIG. 4 4. The equilibrium temperature depends on the voltage applied to the printed PTC heater 130, as well as the thermal dissipation factor of the printed PTC heater 130. The printed PTC heater 130 is a self-regulating and self-limiting resistance heater. The printed PTC heater 130 is self-regulating in such a way that every point of printed PTC heater 130 independently keeps a constant temperature without the need of a separated temperature regulator. The printed PTC heater 130 is self-limiting in such a way that each point of printed PTC heater 130 can never exceed a set temperature limit, thus requiring no overheat protection. Advantageously, the use of the printed PTC heater 130 eliminates the need for a temperature sensor and electronic thermostat for the flexible heated hose assembly 100.

In an embodiment, the flexible heated hose assembly 100 may include an inner fluid tube 110, a first silicone liner 120, and a printed PTC heater 130. The inner fluid tube 110 defines the fluid passageway 108. The inner fluid tube 110 may be coated with a fully fluorinated fluoropolymer coating. A first silicone liner 120 is located radially outward from the inner fluid tube 110 (i.e. the first silicone liner 120 is wrapped around the inner fluid tube 110). The printed PTC heater 130 is located radially outward from the first silicone liner 120 (i.e. printed PTC heater 130 is wrapped around the first silicone liner 120). The printed PTC heater 130 may include a pressure sensitive adhesive 132 to secure the printed PTC heater 130 to the first silicone liner 120. The pressure sensitive adhesive is located on a radially inward surface of the printed PTC heater 130, as shown in FIG. 2. As shown in FIG. 1, electrical lead lines 104 may be electrically connected to the printed PTC heater 130 to convey electricity to the printed PTC heater 130.

In another embodiment, in addition to the inner fluid tube 110, the first silicone liner 120, and the printed PTC heater 130 the flexible heated hose assembly 100 may further include at least one of a second silicone liner 122, a first Aramid fiber braid 140, a third silicone liner 124, a corrosion resistant steel (CRES) braid 150, and a second Aramid fiber braid 142. The inner fluid tube 110 defines the fluid passageway 108. Each silicone liner 120, 122, 124 may be uncured when first wrapped within the flexible heated hose assembly 100 and then cured once the flexible heated hose assembly 100 is assembled (i.e. fully wrapped). The second silicone liner 122 may be located radially outward from the printed PTC heater 130 (i.e. the second silicone liner 122 is wrapped around the printed PTC heater 130). Advantageously, the second silicone liner 122 may provide protection for printed PTC heater 130 as electrical insulator. Also advantageously, the second silicone liner 122 may be used to improve the dielectric strength of the flexible heated hose 100. In an embodiment, the second silicone liner 122 may be replaced by a polyimide liner or similar polymer liner known to one of skill in the art.

The first Aramid fiber braid 140 may be located radially outward from the second silicone liner 122 (i.e. the first Aramid fiber braid 140 is wrapped around the second silicone liner 122). The first Aramid fiber braid 140 provides insulation to the flexible heated hose assembly 100 to help contain the heat produced by the printed PTC heater 130. The first Aramid fiber braid 140 may alternatively be composed of Nylon or Polyester.

The third silicone liner 124 may be located radially outward from the printed PTC heater 130 (i.e. the third silicone liner 124 is wrapped around the first Aramid fiber braid 140). The third silicone liner 124 may provide bond between first aramid braid 140 and the CRES braid 150. The CRES braid 150 may be located radially outward from the third silicone liner 124 (i.e. the CRES braid 150 is wrapped around the third silicone liner 124). The CRES braid 150 provides structure support and protection for the flexible heated hose assembly 100 to prevent the flexible heated hose assembly 100 from kinking, which may inhibit fluid flow through the fluid passageway 108.

The second Aramid fiber braid 142 may be located radially outward from the CRES braid 150 (i.e. the second Aramid fiber braid 142 is wrapped around the CRES braid 150). The first Aramid fiber braid 140 provides insulations to the flexible heated hose assembly 100 to help contain the heat produced by the printed PTC heater 130, while protecting the flexible heated hose assembly 100 from temperature variations outside of the flexible heated hose assembly 100. The second Aramid fiber braid 142 may alternatively be composed of Nylon or Polyester.

Advantageously, a flexible heated hose assembly 100 composed of layers including the inner fluid tube 110, the first silicone liner 120, the printed PTC heater 130, the second silicone liner 122, the first Aramid fiber braid 140, the third silicone liner 124, the CRES braid 150, and the second Aramid fiber braid 142 is capable of operating within an environment operating temperature range between −65° F. and +185° F. (−53° C. and +85° C.).

Figure 5:
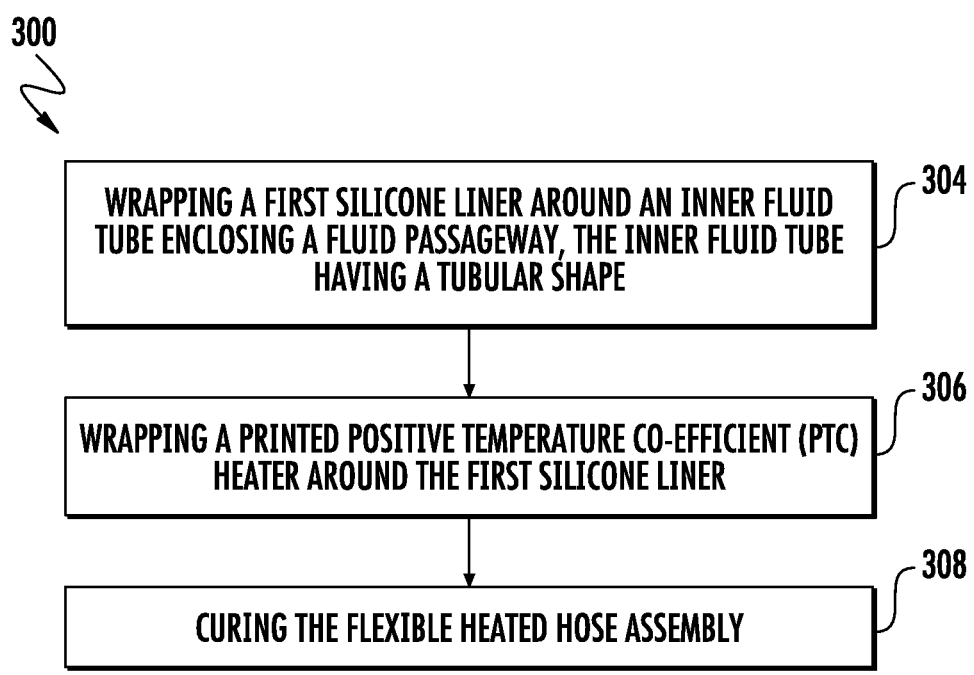
FIG. 5 is a diagram of a method of manufacturing the flexible heated hose assembly of FIGS. 1 and 2, according to an embodiment of the present disclosure.

Referring now to FIG. 5, with continued reference to FIGS. 1-4. FIG. 5 shows a method 300 of manufacturing the flexible heated hose assembly 100. At block 304, a first silicone liner 120 is wrapped around an inner fluid tube 110 enclosing a fluid passageway 108. The inner fluid 110 tube may have a tubular shape, as shown in FIG. 2. At block 306, a printed PTC heater 130 is wrapped around the first silicone liner 120. The printed PTC heater 130 to the first silicone liner 120 using a pressure sensitive adhesive 132 interposed between the first silicone liner 120 and the printed PTC heater 130. At block 308, the flexible heated hose assembly 100 is cured. The flexible heated hose assembly 100 may be cured in an oven.

Prior to block 308, the method 300 may include at least one of: wrapping a second silicone liner 122 around the printed PTC heater 130; wrapping a first Aramid fiber braid 140 around the printed PTC heater 130; and wrapping a CRES braid 150 around the printed PTC heater 130. Prior to block 308, the method 300 may further include: wrapping a second silicone liner 122 around the printed PTC heater 130; wrapping a first Aramid fiber braid 140 around the second silicone liner 122; wrapping a third silicone liner 124 around the first Aramid fiber braid 140; wrapping a CRES braid 150 around the third silicone liner 124; and wrapping a second Aramid fiber braid 142 around the CRES braid 150.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flexible heated hose assembly for an aircraft, comprising:
   an inner fluid tube enclosing a fluid passageway, the inner fluid tube having tubular shape;
   a first silicone liner located radially outward from the inner fluid tube;
   a printed positive temperature co-efficient (PTC) heater located radially outward from the first silicone liner; and
   a pressure sensitive adhesive interposed between the first silicone liner and the printed PTC heater, wherein the printed PTC heater is attached to the first silicone liner via the pressure sensitive adhesive,
   wherein the printed PTC heater comprises a polyimide film, a PTC heater ink, and a heat seal adhesive.

2. The flexible heated hose assembly of claim 1, further comprising:

at least one of a second silicone liner, a first Aramid fiber braid, a third silicone liner, a corrosion resistant steel (CRES) braid, and a second Aramid fiber braid.

3. The flexible heated hose assembly of claim 2, further comprising:
a polyimide liner located radially outward from the printed PTC heater.

4. The flexible heated hose assembly of claim 2, wherein the inner fluid tube is coated with a fully fluorinated fluoropolymer coating.

5. The flexible heated hose assembly of claim 1, further comprising:
a second silicone liner located radially outward from the printed PTC heater;
a first Aramid fiber braid located radially outward from the second silicone liner;
a third silicone liner located radially outward from the first Aramid fiber braid;
a corrosion resistant steel (CRES) braid located radially outward from the third silicone liner; and
a second Aramid fiber braid located radially outward from the CRES braid.

6. The flexible heated hose assembly of claim 1, further comprising:
a second silicone liner located radially outward from the printed PTC heater.

7. The flexible heated hose assembly of claim 6, further comprising:
a first Aramid fiber braid located radially outward from the second silicone liner.

8. The flexible heated hose assembly of claim 7, further comprising:
a third silicone liner located radially outward from the first Aramid fiber braid.

9. The flexible heated hose assembly of claim 8, further comprising:
a corrosion resistant steel (CRES) braid located radially outward from the third silicone liner.

10. A method of manufacturing a flexible heated hose assembly for an aircraft, the method comprising:
wrapping a first silicone liner around an inner fluid tube enclosing a fluid passageway, the inner fluid tube having a tubular shape;
wrapping a printed positive temperature co-efficient (PTC) heater around the first silicone liner;
attaching the printed PTC heater to the first silicone liner using a pressure sensitive adhesive interposed between the first silicone liner and the printed PTC heater; and
curing the flexible heated hose assembly,
wherein the printed PTC heater comprises a polyimide film, a PTC heater ink, and a heat seal adhesive.

11. The method of claim 10, wherein prior to the curing the method further comprises at least one of:
wrapping a second silicone liner around the printed PTC heater;
wrapping a first Aramid fiber braid around the printed PTC heater; and
wrapping a corrosion resistant steel (CRES) braid around the printed PTC heater.

12. The method of claim 10, wherein prior to the curing the method further comprises:
wrapping a second silicone liner around the printed PTC heater;
wrapping a first Aramid fiber braid around the second silicone liner;
wrapping a third silicone liner around the first Aramid fiber braid;
wrapping a corrosion resistant steel (CRES) braid around the third silicone liner; and
wrapping a second Aramid fiber braid around the CRES braid.

13. The method of claim 10, wherein prior to the curing the method further comprises:
wrapping a second silicone liner around the printed PTC heater.

14. The method of claim 13, wherein prior to the curing the method further comprises:
wrapping a first Aramid fiber braid around the second silicone liner.

15. The method of claim 14, wherein prior to the curing the method further comprises:
wrapping a third silicone liner around the first Aramid fiber braid.

16. The method of claim 15, wherein prior to the curing the method further comprises:
wrapping a corrosion resistant steel (CRES) braid around the third silicone liner.

17. The method of claim 10, wherein prior to the curing the method further comprises:
wrapping a polyimide liner around the printed PTC heater.

18. The method of claim 10, further comprising:
coating the inner fluid tube with a fully fluorinated fluoropolymer.

* * * * *